Oct. 20, 1970  B. MEBES  3,534,547
METHOD AND APPARATUS FOR DECONTAMINATION OF EXHAUST
GASES FROM INTERNAL COMBUSTION ENGINES
Filed May 21, 1968  2 Sheets-Sheet 1

INVENTOR
BRUNO MEBES
ATTORNEYS
Jacobi & Davidson

United States Patent Office 3,534,547
Patented Oct. 20, 1970

3,534,547
METHOD AND APPARATUS FOR DECONTAMINATION OF EXHAUST GASES FROM INTERNAL COMBUSTION ENGINES
Bruno Mebes, Burgdorf, Switzerland, assignor to Sanitized A.G., Burgdorf, Berne, Switzerland
Filed May 21, 1968, Ser. No. 730,696
Claims priority, application Switzerland, May 22, 1969, 7,147/67
Int. Cl. F02b 75/10
U.S. Cl. 60—30                              10 Claims

ABSTRACT OF THE DISCLOSURE

Method and apparatus for the decontamination or purification of exhaust gases from internal combustion engines wherein the impurities, particularly carbon monoxide and residual hydrocarbons, are oxidized by combusting a mixture of the exhaust gases and combustion air in a reaction chamber under the effect of an ultrasonic field. A catalyst may be provided in the reaction chamber which is heated to its reaction temperature by means of the heat produced as a result of the combustion of the gas mixture, this catalyst serving to further ensure practically complete combustion of the gas mixture and elimination of the contaminants therein.

---

This invention relates to "anti-pollution" devices and techniques and relates more particularly to the decomposition or purification of exhaust gases from internal combustion engines. Such exhaust gases contain various undesirable constituents, particularly carbon monoxide and residual hydrocarbons.

The prior art relating to decontamination or purification of exhaust gases from internal combustion engines prior to their emission into the atmosphere has employed essentially the following two methods:

(1) Decontamination of the exhaust gases by catalytic oxidation; and
(2) Decontamination of the exhaust gases by means of afterburning in an afterburner with an open igniting flame.

Decontamination of exhaust gases by means of catalysts has the drawback that the catalysts, depending on their characteristics, are generally only effective at temperatures of between 250 to 350° C. Such catalyst temperatures cannot be achieved under all operating conditions of an internal combustion engine, without additionally heating the exhaust gases or the catalyst. The reason for this is that as an internal combustion engine idles, particularly in the case of automobile engines, the exhaust gases being produced thereby possess a temperature of only between 260 to 280° C. as they leave the engine, and they possess even lower temperatures when the engine is being started, particularly during cold seasons.

With respect to decontamination of exhaust gases by means of afterburning in an afterburner with an open igniting flame, it is difficult to keep the igniting flame alive under all operational conditions. Moreover, such afterburners cause continuous fuel consumption.

It is a primary object of the instant invention to provide a method and apparatus which make it possible to obviate the drawbacks of the known techniques and devices and which will permit staying within the limitations imposed by U.S. laws with respect to the contents of carbon monoxide (1.5 volume percent) and hydrocarbons (275 p.p.m.=0.275 volume percent).

A further object of this invention is the provision of methods and means for decontaminating or purifying exhaust gases from internal combustion engines which are relatively simple and inexpensive while being highly efficient and dependable.

A still further object of this invention is to provide for decontamination of such exhaust gases under the influence of an ultrasonic field which, for special applications, may be modified by the addition of a catalytic oxidation of the exhaust gases.

Thus, with the basic methods and means of this invention, exhaust gases from internal combustion engines may be freed of contaminants without encountering the drawbacks of prior art techniques and devices.

According to the techniques of the instant invention, this is achieved by conducting the exhaust gases with an admixture of combustion air through a reaction chamber to ignite and oxidize them by combustion therein under the effect of an ultrasonic field.

The apparatus of the instant invention for performing this method is characterized as having a reaction chamber, inlets for separate entrance of exhaust gases and combustion air into the reaction chamber, an outlet for exit of the oxidized gas mixture from the reaction chamber and an ultrasonic generator at the end of the inlet to the reaction chamber for producing an ultrasonic field in the reaction chamber.

By means of employing an ultrasonic field in the reaction chamber, it is possible to achieve dependable ignition of the gas mixture consisting of the exhaust gases and the combustion air in the reaction chamber even with low temperatures of the exhaust gases. For practically complete removal of the contaminants in the exhaust gases, a catalyst can be provided in the reaction chamber which is heated to its reaction temperature by means of the heat produced as a result of the combustion of the gas mixture in the reaction chamber.

Other objects of the instant invention will in part be obvious and in part be pointed out as the description of the invention proceeds and as shown in the accompanying drawings wherein.

Figure 1:
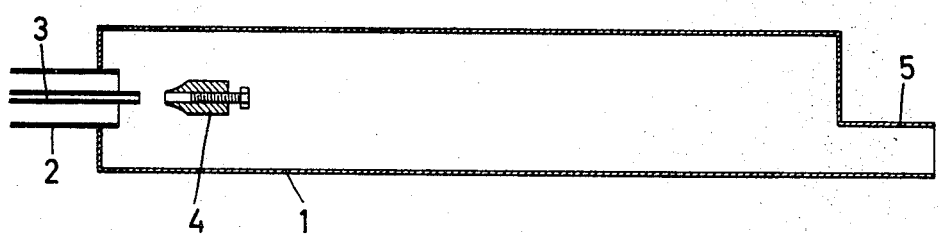
FIG. 1 is a schematic longitudinal sectional view of a first embodiment of an apparatus according to the instant invention with a gas jet oscillating generator of the Hartmann-type used as the ultrasonic generator.
Figure 2A:
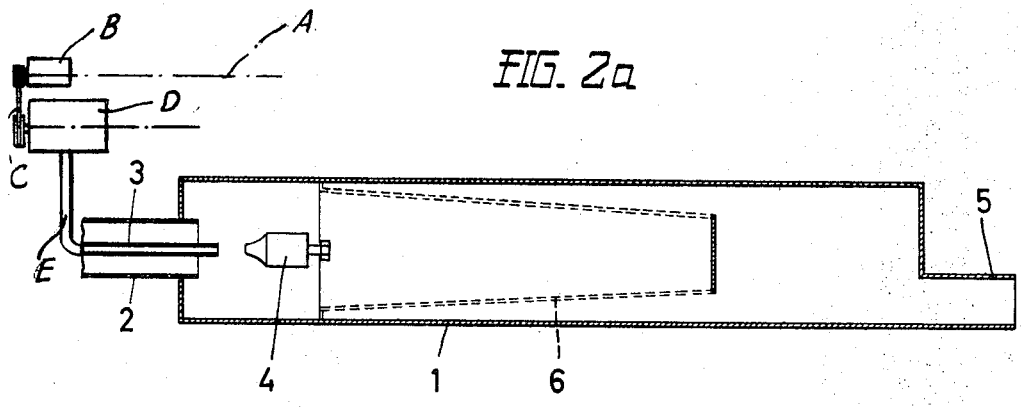
FIGS. 2a and 2b are schematic longitudinal sectional views of a second embodiment of this invention turned by 90 degrees in relation to each other, this embodiment likewise showing a gas jet oscillating generator of the Hartmann-type used as the ultrasonic source, with the reaction chamber in this embodiment being provided with a catalyst.
Figure 2B:
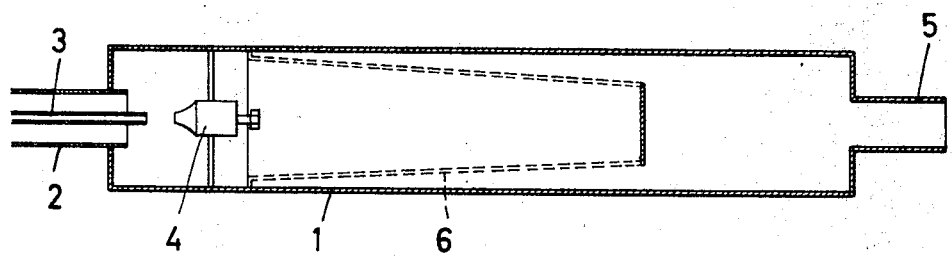
Figure 3:
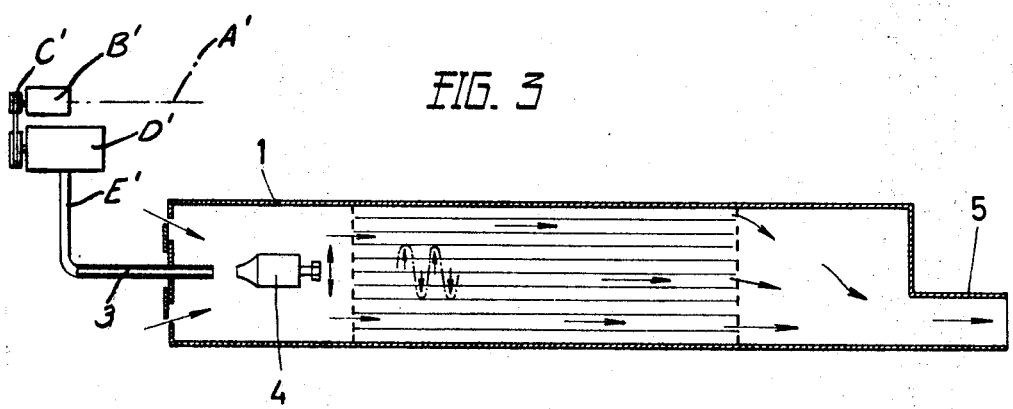
Figure 4:
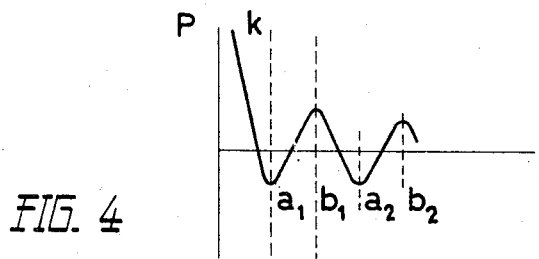

FIG. 3 is a schematic longitudinal sectional view of a variation of the embodiment of the apparatus shown in FIGS. 2a and 2b, the embodiment of FIG. 3 having a different arrangement of the catalyst in the reaction chamber; and, FIG. 4 is an enlarged schematic sectional view of a gas jet oscillating generator of the Hartmann-type as it is employed in the embodiments of FIGS. 1 to 3, with a graph thereabove illustrating the pressure distribution within the air current as related to the distance from the nozzle.

Like reference characters refer to like parts throughout the several views of the drawings.

Referring now particularly to FIG. 1, the apparatus depicted therein comprises a reaction chamber 1 having a configuration of a hollow cylinder. A pipe 2 for inlet of the exhaust gases emanating from an internal combustion engine is provided in the center of the left side wall of the reaction chamber 1 as viewed in FIG. 1. The combustion air is conducted to the reaction chamber 1 through a thinner pipe 3 which is mounted coaxially in pipe 2, the combustion air being conducted therethrough by means of a suitable compressed air source, for example, a compressor or blower (not shown).

The end of the thinner pipe 3 protruding into the reaction chamber 1 is constructed as a nozzle to which the combustion air from the compressed air source is conducted under such pressure as to feed the combustion air into the reaction chamber 1 at a constant speed of in excess of 330 meters per second.

In the reaction chamber 1, a gas jet oscillating generator 4 of the Hartmann-type is provided opposite the aforementioned nozzle. The generator 4 is impinged upon by the combustion air emanating from the nozzle at a speed of more than 330 m./s. and is thereby excited to produce ultrasonic waves. As a result thereof, an ultrasonic field is created in the reaction chamber 1. The contaminants in the exhaust gases, for example, carbon monoxide and residual hydrocarbons, are thus ignited in the gas mixture of combustion air and exhaust gases and are thereby practically completely combusted.

The emission of the decontaminated exhaust gases takes place through an outlet 5 which is provided on the right side wall of the reaction chamber 1 as viewed in FIG. 1.

As a result of employing a compressed air source, the speed of the combustion air streaming out of the nozzle on the pipe 3 is completely independent of the rotational speed of the internal combustion engine. This has the great advantage that the gas jet oscillating generator 4 always produces ultrasonic waves having a frequency within the range of 60 to 120 kHz. independently of the operational conditions of the internal combustion engine so that the CO and the unburnt hydrocarbons in the exhaust gases are dependably ignited and burnt under all operational conditions of the internal combustion engine by means of the ultrasonic field in the reaction chamber 1, i.e., even at a lower rotational speed (such as giving gas when the car is stationary or when the engine is idling) during which the content of contaminants in these exhaust gases is greatest.

As can be seen from the above explanation, the same advantages can be achieved with a compressed air source comprising a simple and inexpensive compressor or blower in cooperation with the likewise simple and inexpensive gas jet oscillating generator of the Hartmann-type as with an expensive magnetostrictive or electrostrictive ultrasonic generator, the latter needing, moreover, an efficient and therefore correspondingly expensive alternating current generator or alternating current voltage generator, respectively, for excitation.

In order to achieve practically complete combustion of the contaminants in the exhaust gases during very limited reaction times, as they occur, for example, in short reaction chambers and/or high velocities of the gas mixture passing through the reaction chamber, a catalyst can be provided in the reaction chamber for additional catalytic combustion of these substances.

A decontaminating apparatus of this type is shown in FIGS. 2a and 2b. The catalyst is mounted on a support bearing 6 which is provided in the reaction chamber 1, the support 6 having a plurality of gas passage openings. Support bearing 6 has the configuration of the surface of a truncated cone wherein the end facing the inlet side of the reaction chamber and having the larger diameter is open and connected to the wall of the reaction chamber 1, whereas the end facing the outlet side of the reaction chamber and having the smaller diameter is closed so that the gas mixture must pass through the gas passage openings in the support bearing 6 and thus pass over the catalyst in order to reach the outlet 5. By virtue of the heat being produced by the burning of harmful and poisonous substances, this burning being caused by the ultrasonic field as described previously, the catalyst is heated to its required reaction temperature thereby causing an additional catalystic combustion of such undesirable substances so that the exhaust gases emanating from the reaction chamber are practically completely decontaminated.

Instead of using combustion air, one can also employ the exhaust gases for exciting the gas jet oscillating generator in the apparatus of FIGS. 1, 2a and 2b, provided that this alternative method employs means, for example, analogous to those in the method which employs combustion air such as in the embodiment of FIG. 1, such means insuring that the exhaust gases are emitted from a nozzle at supersonic speeds under all operational conditions of the internal combustion engine. Thus in FIG. 2a, there is diagrammatically shown the drive shaft A of a motor vehicle, a dynamo B driven thereby, a compressor or blower D, a belt drive C from the dynamo to the compressor or blower and a conduit connection E extending from the blower to the pipe 3.

FIG. 3 shows an appartus which has been especially adapted for this method. In this apapratus, the gas jet oscillating generator is excited by the exhaust gases being emitted from the nozzle, while the combustion air enters the mixing compartment of the reaction chamber 1 through inlets provided for in the left side wall next to the nozzle as viewed in FIG. 3, where it is mixed with the exhaust gases. In FIG. 3 there is diagrammatically shown the drive shaft A' of a motor vehicle, a dynamo B' driven thereby, a compressor or blower D', a belt drive C' from the dynamo to the compressor or blower, and a conduit connection E' extending from the blower to the pipe 3'. Thereafter, the gas mixture travels over a wire net into the reaction chamber 1 which is equipped with baffle plates as schematically shown in FIG. 3 and the gas mixture is there ignited in the same fashion as in the previously described apparatus by the ultrasonic field produced by the gas jet oscillating generator and is burnt while under the affect of the ultrasonic field. The baffle plates can be constructed in such a manner as to be excitable for oscillation by the ultrasonic field whereby the afterburning of the exhaust gases in the reaction chamber is promoted. If, for reasons already mentioned, it is desired that a catalytic post-combustion takes place, it is possible to utilize baffle plates having a catalyst placed thereon or baffle plates consisting of a catalyst. Furthermore, instead of employing baffle plates it is possible to use thin wires or wire nets which consist of a catalyst and which are stretched out in the reaction chamber.

If the exhaust gases already contain substances acting as catalysts, as, for example, heavy metal compositions (e.g., tetraethyl lead), it is possible to forego, in most instances, a standing catalyst even if the reaction times are limited. However, if the decontamination is to be performed under extremely limited reaction times (for example, with reaction chambers of very short construction to achieve the minimally necessary ultrasonic energy), then the use of a standing catalyst is preferred in connection with such exhaust gases.

Suitable catalysts are heavy metal oxides and precious metals. The necessary quantities of these materials can be kept within minimal limitations, wherein the available active surface of the catalyst also plays a role in addition to the activity of the specific catalyst material. Catalysts which have been proven to be particularly suitable are the metal oxides $CuO$, $PbO_2$, $AgO$, $V_2O_5$ and $Cr_2O_3$, and the metals Cu, Ag, Pt, Os and Ir.

A particularly suitable catalyst is a mixture of 99 percent manganese oxide and 1 percent silver oxide or platinum, preferably as platinum sponge, platinum wire or a platinum wire net.

FIG. 4 shows an enlarged schematic sectional view through a gas jet oscillating generator of the Hartmann-type as it is being used in an apparatus such as those shown in FIGS. 1 to 3. A gas jet G, which may be either combustion air or exhaust gases, is emitted from the nozzle D at supersonic speeds and is used in connection with this oscillating generator. The graph above the sectional view in FIG. 4 shows the variation of the pressure distribution within the air current as related to the distance from the nozzle D. If a hollow chamber which functions as an oscillator is opposed to the nozzle D at the points of pressure rise $a_1b_1$ or $a_2b_2$, these points of pressure rise representing points of instability, the hollow chamber will produce sonic sweep oscillations since the hollow chamber is periodically filled with air at an over pressure and in between, the air in the hollow chamber which is at this over pressure is expelled. If "$l$" is the length and "$d$" the diameter of the oscillator hollow chamber, then the resulting sound wave length approximates $$\lambda/4 = 1 + 0.3d$$

Thus, for example, substituting 1 mm. for "$l$" and "$d$," then $\lambda/4$ equals 1.3 mm. or $\lambda = 5.2$ mm. and therefore the sound frequency in air of 18° C. having a propagation velocity where v.=342 m./s.

$$f = \frac{v}{\lambda} = \frac{342}{5.2 \times 10^{-3}} = 65.8 \, kHz.$$

If the dimensions of the oscillator are further reduced, and if air is being used, it is possible to achieve frequencies up to 120 kHz. The achievable response (efficiency of an acoustic system) amounts to up to 50 watts.

Instead of using a gas jet oscillating generator of the Hartmann-type, a magnetostrictive or piezoelectric ultrasonic transmitter may be employed to produce an ultrasonic field in the embodiments of FIGS. 1 to 3. This type of ultrasonic transmitter must likewise be provided in reaction chamber 1 in the vicinity of the gas inlets and it must be mounted in such a manner as to allow it to radiate its sound energy in the direction of the outlet of the reaction chamber.

The following examples illustrate the results which have been achieved in some embodiments of use of the method and apparatus of the instant invention:

EXAMPLE 1

Decontamination by means of an ultrasonic field

A gas mixture consisting of combustion air and exhaust gases was conducted through an apparatus corresponding to that of FIG. 1 and was exposed in the apparatus to the influence of an ultrasonic field having a sound frequency between 60 and 100 kHz. The exhaust gases were produced by an internal combustion engine running on normal gasoline containing lead (tetraethyl lead). The inlet temperature of the gas mixture was 150° C. and its velocity in the apparatus was 350 m./s.

| Content of CO and hydrocarbons (HC) in the gas mixture in volume percent | | | | |
|---|---|---|---|---|
| Before passage | | After passage | | |
| CO | HC | CO | HC | Ignition |
| 5 | 1–1.2 | 0.5 | 0.08–0.12 | Continuous. |
| 5 | 1,1.5 | 0.5 | 0.08–0.13 | Continuous. |

In comparative tests without use of an ultrasonic field at a velocity of the gas current of 200 m./s. in otherwise identical test conditions. The following results were achieved:

| Content of CO and hydrocarbons in the gas mixture in volume percent | | | | |
|---|---|---|---|---|
| Before passage | | After passage | | |
| CO | HC | CO | HC | Ignition |
| 5 | 1–1.2 | 2.5–5 | 0.5–0.7 | Only partial. |
| 5 | 1,1.5 | 5–6 | 0.8–1 | None. |

As is shown by the above results, the use of an ultrasonic field makes it possible to achieve a very effective afterburning and thus decontamination of the exhaust gases of internal combustion engines.

EXAMPLE 2

Decontamination by means of an ultrasonic field and a catalyst

In this embodiment of the method of the instant invention an apparatus similar to that shown in FIGS. 2a and 2b was used for afterburning of the exhaust gases of an internal combustion engine running on lead-containing (tetraethyl lead) normal gasoline. The catalyst used was asbestos having 2 percent $CuO_2$, which was placed in a cage made of a copper wire net in the reaction chamber of the decontamination apparatus. The gas mixture consisting of combustion air and exhaust gases was conducted through this apparatus and, as in Example 1, was exposed to the influence of an ultrasonic field having a sound frequency between 60 and 100 kHz. The inlet temperature of the gas mixture was 150° C. and its velocity in the apparatus was 350 m./s.

| Content of CO and hydrocarbons in the gas mixture in volume percent | | | | |
|---|---|---|---|---|
| Before passage | | After passage | | |
| CO | HC | CO | HC | Ignition |
| 5 | 1–1.2 | 0.3 | 0.02–0.04 | Continuous. |
| 5 | 1–1.5 | Traces | 0.05 | Continuous. |

In comparative tests without the use of an ultrasonic field the following results were achieved where the gas mixture had a velocity of 200 m./s. and under otherwise identical test conditions:

| Content of CO and hydrocarbons in the gas mixture in volume percent | | | | |
|---|---|---|---|---|
| Before passage | | After passage | | |
| CO | HC | CO | HC | Ignition |
| 5 | 1–1.2 | 1 | 0.1–0.15 | Continuous. |
| 5 | 1–1.5 | 2.5–3 | 0.3 | Only partial. |

In tests with gas mixtures having larger quantities of CO, the following values were recorded under like test conditions as in Example 2:

Content of CO in gas mixture in volume percent

| Before passage | After passage |
|---|---|
| 5 | 0.6 |
| 10 | 0.9 |
| 15 | 1.2 |
| 20 | 1.6 |

If a catalyst made of platinum (asbestos with 1 percent platinum sponge) was used instead of a catalyst of $CuO_2$, no CO was found in the exhaust gases emerging from the decontamination apparatus.

Inasmuch as the CO content in exhaust gases from automobile engines seldom exceeds 10 percent even under unfavorable operational conditions (see M. Straubel "Beitrag zur Messung und Bewertung des CO-Gehaltes der Automobilabgase"—Contribution for Measuring and Evaluating the CO Content in Automobile Exhaust Gases—ATZ Pamphlet 4, 1965, pages 115–119), and inasmuch as by its very nature, the CO content in the gas mixture consisting of combustion air and exhaust gases is always smaller than that in exhaust gases, the inventive method permits staying within the, for instance, U.S. prescribed border values of 1.5 volume percent CO and 0.275 volume percent hydrocarbons, even without the use of a catalyst, with no difficulty in complying with the regulations.

Having reference to the foregoing description, it is now believed that the instant inventive concepts will be readily understood. Accordingly,

What is claimed is:

1. In a method for decontaminating exhaust gases from an internal combustion engine, the improvement which comprises feeding the exhaust gases and combustion air into a reaction chamber and conducting an admixture of said gases through the chamber, creating an ultrasonic vibration field in the chamber by pressurizing and impinging a gaseous stream selected from the group consisting of the exhaust gases and the combustion air against a Hartmann-type gas jet oscillation generator arranged at the inlet end of the chamber at a velocity sufficient to cause said Hartmann-type gas jet oscillation generator to create ultrasonic waves in said ultrasonic vibration field having a frequency of between about 60 and 120 kHz., whereby the gas mixture is ignited while under the influence of the ultrasonic field and oxidized by combustion.

2. The method of claim 1 wherein said gaseous stream is impinged upon the generator at a velocity which is independent of the rotational speed of the internal combustion engine and greater than 330 m./s.

3. The method of claim 2 wherein said gaseous stream comprises combustion air.

4. The method of claim 2 wherein said gaseous stream comprises exhaust gases.

5. The method of claim 1 wherein the gas mixture is conducted over a catalyst within the reaction chamber for additional catalytic oxidation thereof and said catalyst is selected from the group consisting of copper oxide, vanadium pentoxide and a mixture of 99 percent manganese oxide and 1 percent of a material selected from the group consisting of silver oxide and platinum.

6. In an apparatus for decontaminating exhaust gases from an internal combustion engine, the improvement which comprises a reaction chamber, separate inlets in said reaction chamber for entrance of a gaseous stream of exhaust gases and a gaseous stream of combustion air, an outlet from said reaction chamber for exit of the oxidized gas mixture, a Hartmann-type gas jet oscillation generator mounted at the inlet end of said reaction chamber, a nozzle at said inlet end so arranged that a gaseous stream fed therethrough blows on said generator, and means for pressurizing and feeding one of said gaseous streams through said nozzle and into said chamber to impinge on said generator at a velocity such that said generator produces ultrasonic waves having a frequency in the range of about 60 to 120 kHz.

7. The apparatus of claim 6 wherein said means for pressurizing and feeding said one gaseous stream to said reaction chamber imparts a velocity which is independent of the rotational speed of the internal combustion engine and greater than 330 m./s.

8. The apparatus of claim 6 further including, in said reaction chamber, a bearing support for a catalyst to provide additional catalytic oxidation of the gas mixture.

9. The apparatus of claim 8 wherein said catalyst is selected from the group consisting of copper oxide, vanadium pentoxide and a mixture of 99 percent manganese oxide and 1 percent of a material selected from the group consisting of silver oxide and platinum.

10. The apparatus of claim 9 wherein the platinum is in a form selected from the group consisting of platinum sponge, platinum wire and platinum wire net.

References Cited

UNITED STATES PATENTS

| | | | |
|---|---|---|---|
| 2,795,103 | 6/1957 | Jenison | 60—30 |
| 3,189,418 | 6/1965 | Gary | 60—30 XR |
| 3,197,955 | 8/1965 | Cohn et al. | 60—30 |
| 3,201,338 | 8/1965 | Pennington | 60—30 |
| 3,276,202 | 10/1966 | Gary | 60—30 |
| 3,326,787 | 6/1967 | Jacobs | 204—158 XR |

FOREIGN PATENTS 880,408    6/1953    Germany.

BENJAMIN W. WYCHE III, Primary Examiner

U.S. Cl. X.R.

204—158